(12) United States Patent
Boaz et al.

(10) Patent No.: US 6,816,893 B2
(45) Date of Patent: Nov. 9, 2004

(54) WEB BASED NO PRINT FEATURE

(75) Inventors: Carey David Boaz, Louisville, KY (US); Joseph M. Hedrick, Indianapolis, IN (US); Steve E. Anderson, Crestwood, KY (US)

(73) Assignee: General Electric Company, Schenectady, NY (US)

( * ) Notice: Subject to any disclaimer, the term of this patent is extended or adjusted under 35 U.S.C. 154(b) by 301 days.

(21) Appl. No.: 09/754,418

(22) Filed: Jan. 5, 2001

(65) Prior Publication Data

US 2003/0037121 A1 Feb. 20, 2003

(Under 37 CFR 1.47)

(51) Int. Cl.$^7$ ............................................... G06F 15/16
(52) U.S. Cl. ..................... 709/218; 345/700; 345/760; 345/764; 347/71; 358/1.14; 358/1.15; 704/270; 715/501; 715/513
(58) Field of Search ................................ 345/760, 764, 345/700; 715/501, 513; 709/218; 713/201; 704/270; 358/1.14, 1.15; 347/71

(56) References Cited

U.S. PATENT DOCUMENTS

| 5,434,596 | A | * | 7/1995 | Stephenson | 347/71 |
| 5,895,476 | A | | 4/1999 | Orr et al. | 715/517 |
| 5,895,477 | A | | 4/1999 | Orr et al. | 715/517 |
| 5,956,709 | A | | 9/1999 | Xue | 707/3 |
| 5,986,662 | A | | 11/1999 | Argiro et al. | 345/424 |
| 5,991,514 | A | * | 11/1999 | Nielsen | 358/1.14 |
| 6,442,523 | B1 | * | 8/2002 | Siegel | 704/270 |
| 6,608,697 | B1 | * | 8/2003 | Schorr et al. | 358/1.15 |
| 6,629,135 | B1 | * | 9/2003 | Ross et al. | 709/218 |
| 2002/0069365 | A1 | * | 6/2002 | Howard et al. | 713/201 |

* cited by examiner

*Primary Examiner*—Jack B. Harvey
*Assistant Examiner*—Hai V. Nguyen
(74) *Attorney, Agent, or Firm*—George L. Rideout, Esq.; Armstrong Teasdale LLP (57) ABSTRACT

The present invention provides a method of displaying at least one alpha-numeric character of an HTML based web page that will not be printed when the web page is printed. The process consists of generating at least one transparent graphic image, wherein each graphic image is a non-printing alpha-numeric character on a non-printing background, getting a respective transparent graphic image for each alpha-numeric character when the no print feature is desired, and generating a web page comprising each of the transparent graphic images, wherein the web page has a contrasting background relative to the color of the respective alpha-numeric character.

20 Claims, 6 Drawing Sheets

(Prior Art)

| | | | | |
|---|---|---|---|---|
| GSD5940DSS | Stainless Steel - GE Profile Performance~Triton~Built-In Dishwasher | Est Retail Price Your Price Employee Discount Mail-in Rebate |  | ADD TO CART |
| GSD5950DCC | Bisque-on-Bisque - GE Profile Performance~Triton~Built-In Dishwasher | Est Retail Price Your Price Employee Discount Mail-in Rebate |  | ADD TO CART |
| GSD5930DWW | White-on-White - GE Profile Performance~Triton~Built-In Dishwasher | Est Retail Price Your Price Employee Discount Mail-in Rebate |  | ADD TO CART |
| GSD5920DBB | Black-on-Black - GE Profile Performance~Triton~Built-In Dishwasher | Est Retail Price Your Price Employee Discount Mail-in Rebate |  | ADD TO CART |
| GSD5650DCC | Bisque-on-Bisque - GE Profile Performance~Triton~Built-In Dishwasher | Est Retail Price Your Price Employee Discount Mail-in Rebate |  | ADD TO CART |
| GSD5610DAA | Almond-on-Almond - GE Profile Performance~Triton~Built-In Dishwasher | Est Retail Price Your Price Employee Discount Mail-in Rebate |  | ADD TO CART |

| | | | |
|---|---|---|---|
| GSD5630DWW | White-on-White - GE Profile Performance~Triton~Built-In Dishwasher | Est Retail Price<br>Your Price<br>Employee Discount<br>Mail-in Rebate | 🛒 ADD TO CART |
| GSD5620DBB | Black-on-Black - GE Profile Performance~Triton~Built-In Dishwasher | Est Retail Price<br>Your Price<br>Employee Discount<br>Mail-in Rebate | 🛒 ADD TO CART |
| GSD5350DCC | Bisque-on-Bisque - GE Profile~Triton~Built-In Dishwasher | Est Retail Price<br>Your Price<br>Employee Discount | 🛒 ADD TO CART |
| GSD5310DAA | Almond-on-Almond - GE Profile~Triton~Built-In Dishwasher | Est Retail Price<br>Your Price<br>Employee Discount | 🛒 ADD TO CART |

→ NEXT

FIG. 5B

WEB BASED NO PRINT FEATURE

BACKGROUND OF THE INVENTION

This invention relates generally to a web page disabling feature and more particularly to disabling the ability of a user to print alpha-numeric characters being displayed on a web page.

With the advent of the Internet the selling of goods and services via the internet has become a booming business. The Internet is fundamentally changing the way merchants and suppliers conduct business with the customer. In the past information may have been communicated orally to the customer. Now information is indirectly communicated to the customer in an electronic and sometimes in a written format, information that historically may have been preferably communicated in oral form. Sensitive information may at times be provided on the Internet such as the price of goods and services, the availability of goods and services, key features of goods, etc. While it is desirable to communicate sensitive information on a web based display, is may not be desirable to enable the user to print all of the contents of a web page including the sensitive information. As such, there exists a need to provide a simple web based feature that inhibits the user from printing sensitive information being displayed on the web page.

One example graphics export feature is the GIF89 export feature which enables the user of the feature to specify what color, to eliminate from the graphic image. For example the graphic image may be the letter "2" illustrated by the color white having a black background. The GIF89 export feature allows the user to erase the black background leaving a white character on a transparent background.

BRIEF SUMMARY OF THE INVENTION

The present invention provides a method of displaying at least one alpha-numeric character of a web page, that will not print on a printer. The process consists of generating at least one transparent graphic image, wherein each graphic image is a non-printing alpha-numeric character on a non-printing background, next getting a respective transparent graphic image for each alpha-numeric character when the no print feature is desired, and generating a web page comprising each of the transparent graphic images, wherein the web page has a contrasting background relative to the color of the respective alpha-numeric character. The web page can thus be printed without showing the transparent graphic image on the printed page.

DETAILED DESCRIPTION OF THE INVENTION

The present invention provides a simple web page feature that inhibits the user from printing predetermined HTML based characters being displayed on the users display. The present invention uses a character export feature to accomplish the no print function. In this invention white text images are created on a transparent background using a commercially available character export feature. When the white text is placed on a contrasting background it may be displayed on a screen but will not appear on a printed version of the screen.

Figure 1:
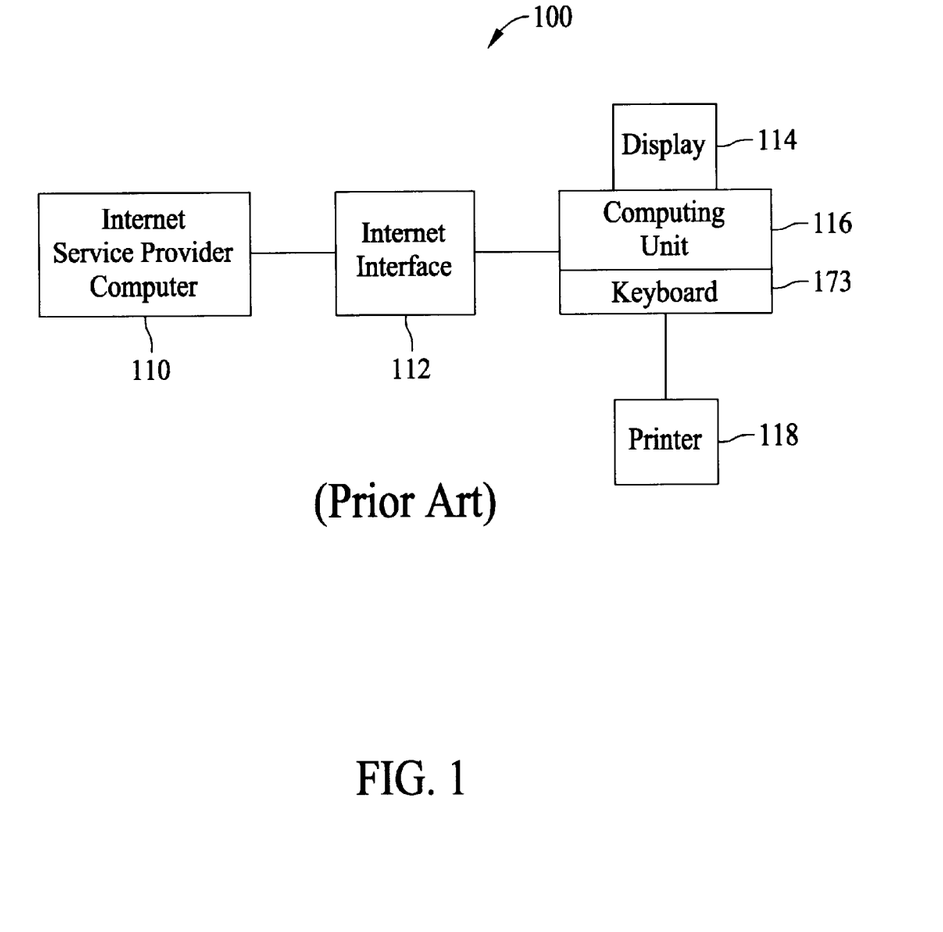
FIG. 1 is a schematic block diagram of a prior art Internet based computing system.

Now referring to FIG. 1, which illustrates a typical Internet based computing system 100, computing system 100 comprises components that cooperate in a process that couples the Internet service provider to the user.

Internet based computing system 100 comprises an Internet interface 112, and an Internet Service Provider (ISP) 110 and at least one computing unit 116. In one embodiment, internet interface 112 comprises a Internet based communications link. The communications link may use audio and alternatively fiber optic communications means to support web based communications. In one embodiment computing unit 116 communicate using the Transmission Control Protocol/Internet Protocol (TCP/IP). ISP 110 is typically a Internet based server which interfaces with a plurality of browsers so as to effect Internet based communications. One exemplary server is the Netscape Application Server™. Computing unit 116 comprises a browser. One exemplary browser is the MICROSOFT INTERNET EXPLORER 4.0™. Computing unit 116 may also comprise a commercially available display 114 and a commercially available printer 118. Computing unit 116 also comprises a keyboard 173.

In an exemplary embodiment the ISP 110 may be accessed by a respective computing unit 116 by providing a web address having a registered Uniform Resource Locator (URL) hyperlink "www.geappliances.com" and by providing an associated password on most commercially available web browsers. Additionally, ISP 110 may comprise a computer program storage medium readable by a computer system and encoding a computer program of instructions for executing a computer process.

Figure 2:
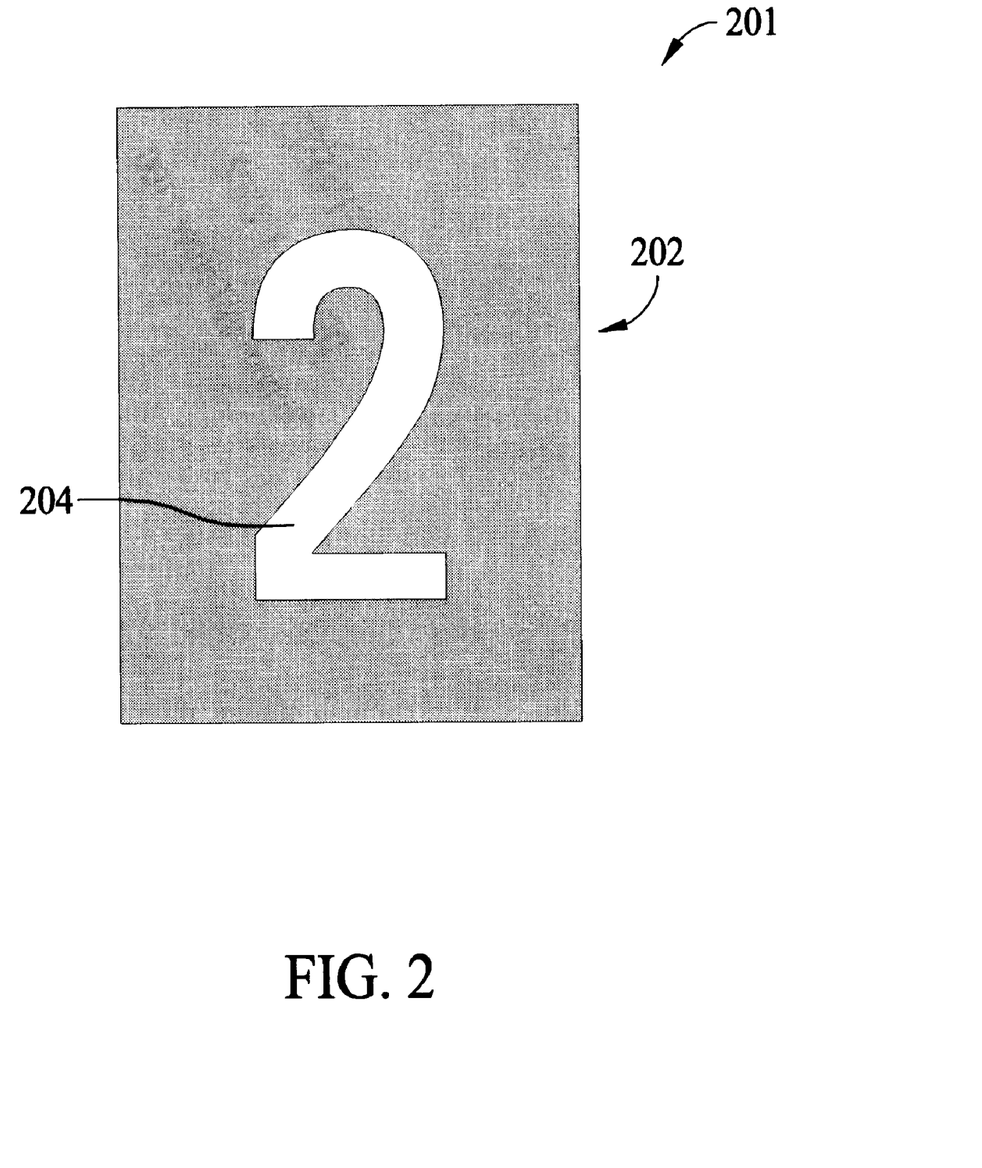
FIG. 2 is an illustration of a alpha-numeric character GIF89 image having a contrasting background.

FIG. 2 is an exemplary illustration of a GIF89 export feature 201 comprising a white alpha-numeric character graphic image 202 "2", having a black background 204. A set of characters is generated and stored at ISP 110 having the specialized white foreground and transparent background. One exemplary transparent background is white. It is understood that any background the does not show up when printed may be characterized as a transparent background. The set of characters comprises all those characters that the Internet service provider does not want to be printed although they may be viewed on a display. It is understood that any commercially available graphic image export feature may be used that interacts with any graphics image protocol including, by way of example and not limitation, GIF, JPEG, PNG, PCX, and TIP based graphic images.

Figure 3:
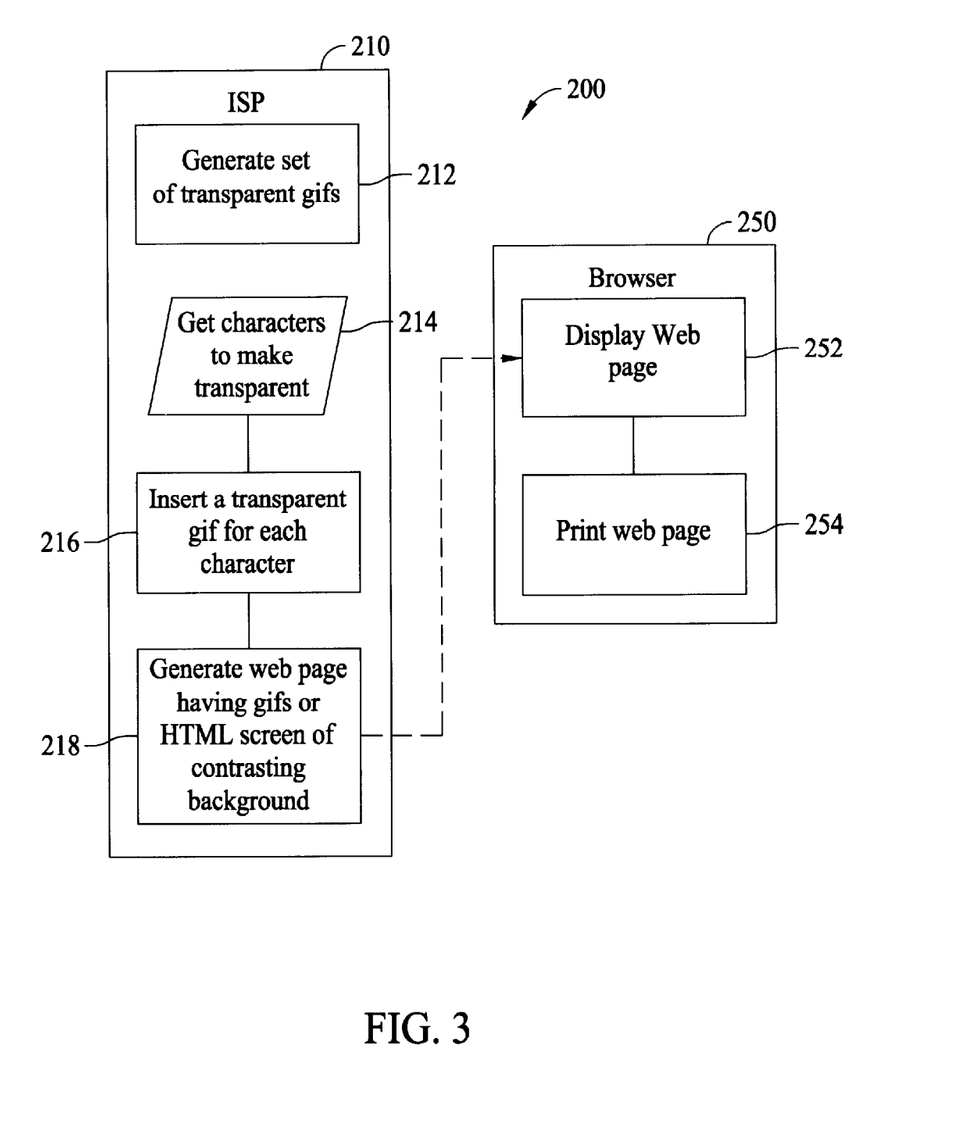
FIG. 3 is a process flow diagram of the no print feature of the present invention.

FIG. 3 is a process flow diagram 200 of the no print feature of the present invention. Process flow diagram 200 comprises ISP process flow 210 and computing unit process flow 250. ISP process flow 210 may be executed in ISP 110 and comprises steps 212, 214, 216, and 218. Computing unit process flow 250 may be executed in computing unit 116 and comprises steps 252 and 254.

Further detail of ISP process flow 210, as illustrated in FIG. 3, has as a first step the generation of a set of transparent graphic images, each image having a white alpha-numeric character 202 on transparent background 204, step 212. The set of transparent graphic images 201 may be stored on a storage medium for easy access during the creation of the web page. Next, the alpha-numeric characters that are desired to be made transparent during printing are identified, step 214. Next, a respective transparent graphic image 201 is substituted for each selected alpha-numeric character, step 216. Finally, the web page can be generated using the above identified substituted transparent graphic images, step 18. The background of the web page is selected to contrast with the white alpha-numeric character set. In one exemplary embodiment the web page background is blue. This contrasting background is selected so that the set of alpha-numeric characters 201 may be visible while being displayed.

Figure 4:
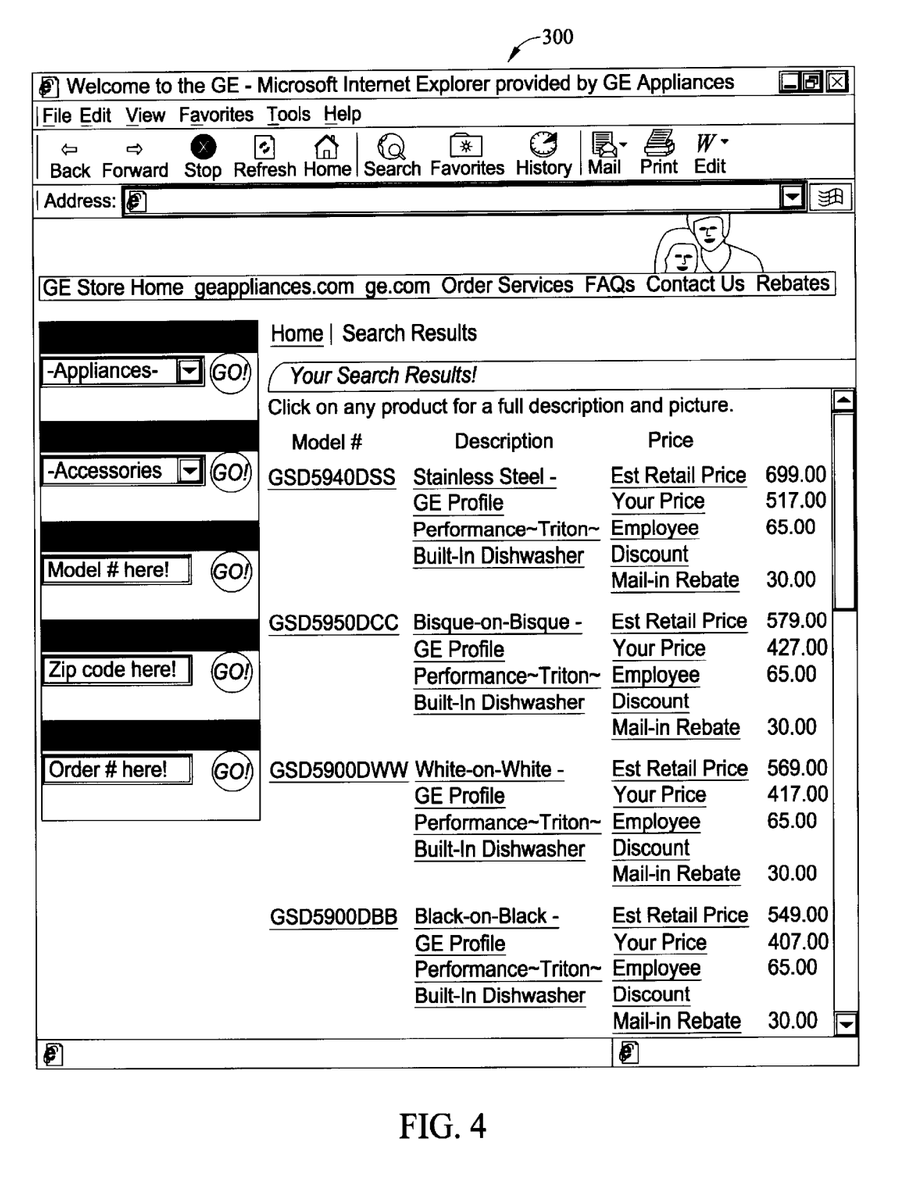
FIG. 4 is an illustration of an example display of a web page utilizing the present invention.
Figure 5A:
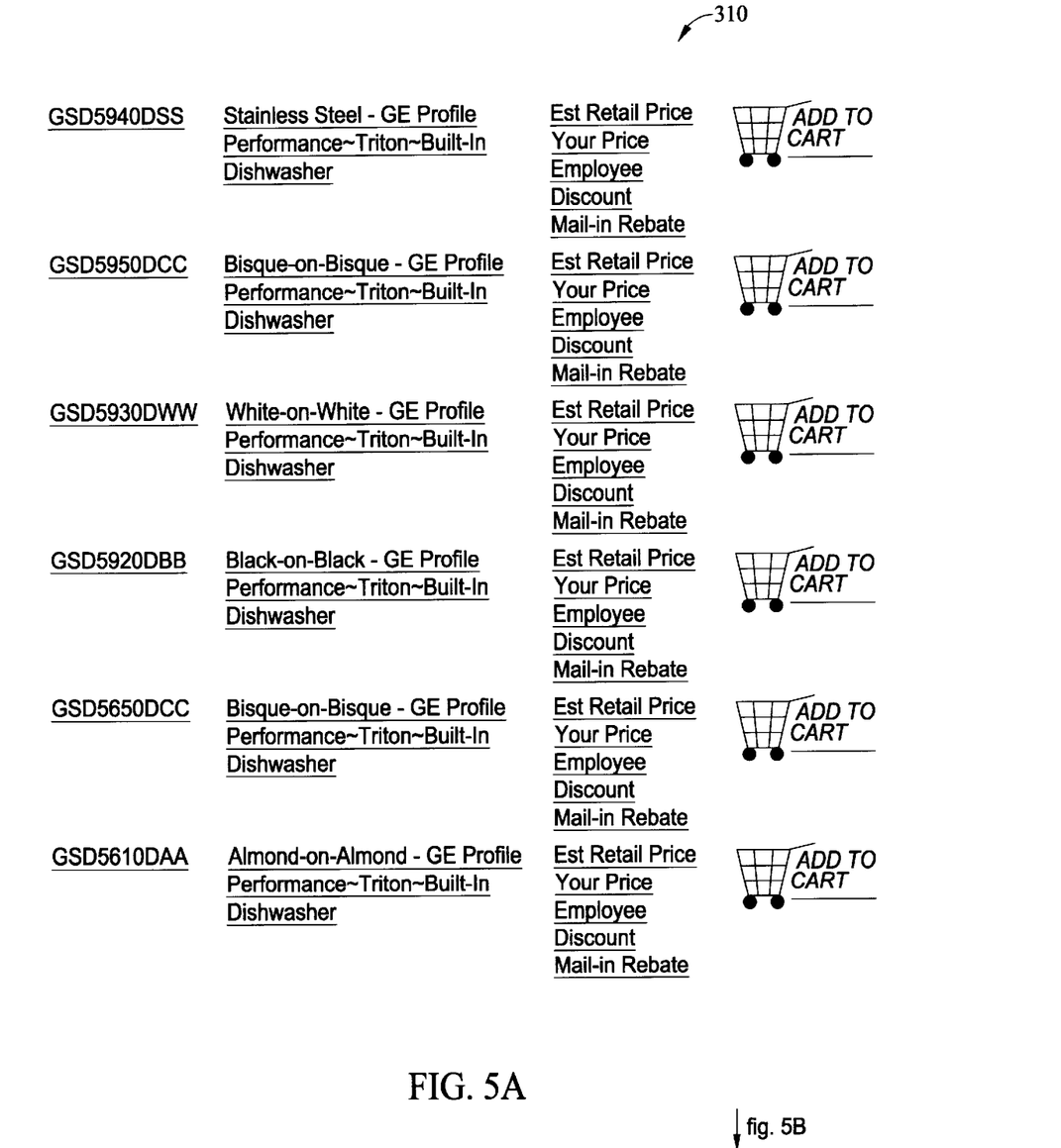
FIG. 5A is a first portion of an illustration of an example print out of the web page of FIG. 4, utilizing the present invention.
Figure 5B:
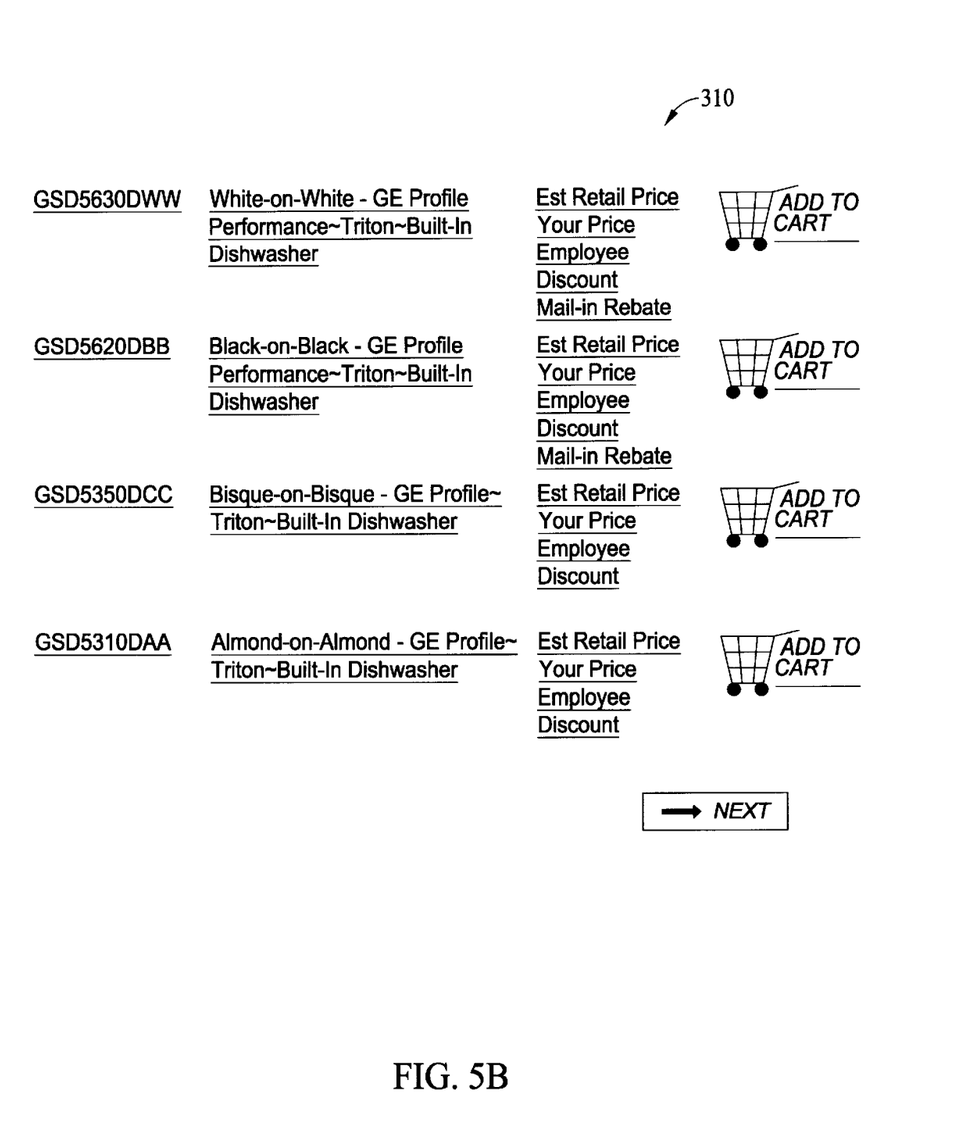
FIG. 5B is a second portion of an illustration of an example print out of the web page of FIG. 4, utilizing the present invention.

Computing unit process flow 250 comprises steps 252, which include displaying the web page and subsequently printing the web page, step 254. The web page may be generated and displayed on display 114 in the HTML format and alternatively in the Dynamic HTML format. The web page may also be printed on printer 118. In one exemplary illustration, shown in FIG. 4, a web page 300 is displayed having prices listed as white transparent characters on a blue background. FIG. 5A is a first portion of an illustration of displayed page 310 being printed. FIG. 5B is a second portion of an illustration of displayed page 310 being printed. The price list is not seen on the printed page because it compromises transparent characters.

Advantages of the present invention include the ability of the Internet service provider to selectively disable sensitive information, such as price lists from being printed from a web page by using a standard graphics image export feature on an existing HTLM based web page. The present invention is also simple to use and thus can easily be reversed by changing the graphic image background to a non transparent background to enable the sensitive information to be printed.

The present invention is a method of displaying at least one alpha-numeric character of an HTML based web page, wherein the at least one alpha-numeric character will not print on a printer. The no print feature method comprises the steps of generating at least one transparent graphic image, wherein each graphic image is a non-printing alpha-numeric character on a non-printing background; getting a respective transparent graphic image for each alpha-numeric character when the no print feature is desired; and generating a web page comprising each of the transparent graphic images, wherein the web page has a contrasting background relative to the color of the respective alpha-numeric character.

It will be apparent to those skilled in the art that while the invention has been illustrated and described herein in accordance with the patent statutes, modifications and changes may be made in the disclosed embodiments without departing from the true spirit and scope of the invention. It is, therefore, to be understood that the appended claims are intended to cover all such modifications and changes as fall within the true spirit of the invention.

What is claimed is:

1. A method of displaying at least one alpha-numeric character, also identified as a character set, of a web page, wherein said at least one alpha-numeric character will not print on a printer, said method comprising the steps of:

generating at least one transparent graphic image, wherein each graphic image, wherein each graphic image is a non-printing alpha-numeric character on a non-printing background;

getting a respective transparent graphic image for each alpha-numeric character when the no print feature is desired; and generating a web page comprising background relative to the color of said respective alpha-numeric character.

2. The method as recited in claim 1, further comprising the step of displaying said web page.

3. The method as recited in claim 2, further comprising the step of printing said web page.

4. The method as recited in claim 1, wherein said web page comprises an HTML format.

5. The method as recited in claim 1, wherein said transparent graphic image is the GIF89 export feature of a standard export image format.

6. The method as recited in claim 1, wherein said alpha-numeric character set represents prices to be displayed on a web page.

7. The method as recited in claim 1, wherein said respective alpha-numeric character is white on a white background.

8. The method as recited in claim 1, wherein the contrasting background of said web page is blue.

9. A computer program storage medium readable by a computer system and encoding a computer program of instructions for executing a computer process of displaying at least one alpha-numeric character, also identified as a character set, of a web page, wherein said at least one alpha-numeric character will not print on a printer, said computer process comprising the steps of:

generating at least one transparent graphic image, wherein each graphic image is a non-printing alpha-numeric character on a non-printing background;

getting a respective transparent graphic image for each alpha-numeric character when the no print feature is desired; and generating a web page comprising each of said transparent graphic images, wherein said web page has a contrasting background relative to the color of said respective alpha-numeric character.

10. The computer process as recited in claim 9, wherein said web page comprises an HTML format.

11. The computer process as recited in claim 9, wherein said transparent graphic image is the GIF89 export feature of a standard export image format.

12. The computer process as recited in claim 9, wherein said alpha-numeric character set represents prices to be displayed on a web page.

13. The computer process as recited in claim 9, wherein said respective alpha-numeric character is white on a white background.

14. The computer process as recited in claim 9, wherein the contrasting background of said web page is blue.

15. A method of displaying at least one alpha-numeric character, also identified as a character set, of a web page, wherein said at least one alpha-numeric character will not print on a printer, said method comprising the steps of:

means for generating at least one transparent graphic image, wherein each graphic image is a non-printing alpha-numeric character on a non-printing background;

means for getting a respective transparent graphic image for each alpha-numeric character when the no print feature is desired; and     means for generating a web page comprising each of said transparent graphic images, wherein said web page has a contrasting background relative to the color of said respective alpha-numeric character.

16. The method as recited in claim 15, wherein said web page comprises an HTML format.

17. The method as recited in claim 15, wherein said transparent graphic image is the GIF89 export feature of a standard export image format.

18. The method as recited in claim 15, wherein said alpha-numeric character set represents prices to be displayed on a web page.

19. The method as recited in claim 15, wherein said respective alpha-numeric character is white on a white background.

20. The method as recited in claim 15, wherein the contrasting background of said web page is blue.

\* \* \* \* \*

UNITED STATES PATENT AND TRADEMARK OFFICE
CERTIFICATE OF CORRECTION

PATENT NO. : 6,816,893 B2
APPLICATION NO. : 09/754418
DATED : November 9, 2004
INVENTOR(S) : Boaz et al.

It is certified that error appears in the above-identified patent and that said Letters Patent is hereby corrected as shown below:

Column 4, line 11-12, after "wherein each graphic image" delete "wherein each graphic image".

Column 4, line 18, after "comprising" insert -- each of said transparent graphic images, wherein said web page has a contrasting --.

Signed and Sealed this

Twentieth Day of March, 2007

JON W. DUDAS
*Director of the United States Patent and Trademark Office*